US011863652B2

United States Patent
Zhi et al.

(10) Patent No.: US 11,863,652 B2
(45) Date of Patent: Jan. 2, 2024

(54) METHOD FOR FILTERING REDUNDANT DATA PACKET AT NODE IN BLUETOOTH MESH NETWORK

(71) Applicant: ESPRESSIF SYSTEMS (SHANGHAI) CO., LTD., Shanghai (CN)

(72) Inventors: Weijian Zhi, Shanghai (CN); Yulong Huang, Shanghai (CN); Swee Ann Teo, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 169 days.

(21) Appl. No.: 17/436,761

(22) PCT Filed: Feb. 25, 2020

(86) PCT No.: PCT/CN2020/076638
§ 371 (c)(1),
(2) Date: Sep. 7, 2021

(87) PCT Pub. No.: WO2020/177579
PCT Pub. Date: Sep. 10, 2020

(65) Prior Publication Data
US 2022/0191309 A1 Jun. 16, 2022

(30) Foreign Application Priority Data
Mar. 6, 2019 (CN) .......................... 201910168978.1

(51) Int. Cl.
*H04L 69/22* (2022.01)
*H04L 43/028* (2022.01)
(Continued)

(52) U.S. Cl.
CPC ............ *H04L 69/22* (2013.01); *H04L 43/028* (2013.01); *H04L 43/12* (2013.01); *H04W 4/80* (2018.02);
(Continued)

(58) Field of Classification Search
CPC ....... H04L 43/028; H04L 43/12; H04L 69/22; H04W 4/80; H04W 12/02; H04W 12/10; H04W 28/06; H04W 28/14; H04W 84/18
See application file for complete search history.

(56) References Cited

U.S. PATENT DOCUMENTS 10,869,227 B2 * 12/2020 Arvidson ................ H04L 47/32
2008/0205385 A1    8/2008 Zeng et al.
(Continued)

FOREIGN PATENT DOCUMENTS

WO    WO2013/143592 A1    10/2013

OTHER PUBLICATIONS

International Search Report from WO 2020/177579 A1 dated May 19, 2020.
(Continued)

*Primary Examiner* — Thomas J Dailey
(74) *Attorney, Agent, or Firm* — Aird & McBurney LP

(57) ABSTRACT

The present disclosure provides a method for filtering a redundant data packet at a node in a Bluetooth Mesh network. The method comprises the following steps: providing a deduplication filtering cache for storing a combined field value of one or more specified fields of each of one or more Bluetooth Mesh data packets received by the node; upon receipt of a Bluetooth Mesh data packet by the node, comparing a combined field value of one or more specified fields of the data packet with each combined field value stored in the deduplication filtering cache, so as to determine whether the received Bluetooth Mesh data packet is a
(Continued)

redundant data packet. Compared with the prior art, the method of the present disclosure may help to determine whether the data packet is the redundant data packet without decrypting the encrypted fields and de-obfuscating the obfuscated fields, which greatly simplifies the processing flow.

10 Claims, 3 Drawing Sheets

(51) Int. Cl.
  *H04L 43/12* (2022.01)
  *H04W 28/06* (2009.01)
  *H04W 28/14* (2009.01)
  *H04W 4/80* (2018.01)
  *H04W 84/18* (2009.01)
  *H04W 12/02* (2009.01)
  *H04W 12/10* (2021.01)

(52) U.S. Cl.
  CPC .......... *H04W 28/06* (2013.01); *H04W 28/14* (2013.01); *H04W 12/02* (2013.01); *H04W 12/10* (2013.01); *H04W 84/18* (2013.01)

(56) References Cited

U.S. PATENT DOCUMENTS

| | | | |
|---|---|---|---|
| 2015/0245412 A1* | 8/2015 | Tyson | H04W 12/04 370/338 |
| 2016/0165387 A1* | 6/2016 | Nhu | H04W 4/80 455/41.1 |
| 2017/0171071 A1* | 6/2017 | Turon | H04W 4/80 |
| 2018/0343200 A1* | 11/2018 | Jana | H04L 45/70 |
| 2019/0068559 A1* | 2/2019 | Bamidi | H04L 63/0428 |

OTHER PUBLICATIONS

Office Action and Search Report from corresponding Chinese Application No. 201910168978.1 dated Jan. 21, 2021.
CN111669732B CN Priority (with EN cover page).
CN110278547A cited in ISR (with EN cover page).
CN109190424A cited in Chinese Office Action dated Jan. 21, 2021 (with EN cover page).
CN108449774A cited in ISR (with EN cover page).pdf.
CN105553841A cited in ISR (with EN cover page).
CN104754688A cited in ISR (with EN cover page).
CN104734825A cited in ISR (with EN cover page).
CN102395172A cited in ISR (with EN cover page).

* cited by examiner

US 11,863,652 B2

METHOD FOR FILTERING REDUNDANT DATA PACKET AT NODE IN BLUETOOTH MESH NETWORK

TECHNICAL FIELD

The present disclosure relates to a Bluetooth Mesh network, and in particular to a method for filtering a redundant data packet at a node in a Bluetooth Mesh network.

BACKGROUND ART

In a Bluetooth Mesh network, relay nodes are able to receive and forward messages in the same network. The Bluetooth Mesh network may be implemented as a larger network by relaying messages between nodes.

Bluetooth Mesh networks allow publishing and relaying messages by the way of "network flooding", which means that there is not a fixed transmission path of messages and routing table information does not need be saved in nodes. Since all other nodes within the transmission range of a node will receive the message, the nodes with relay function will continue to forward the message to all other nodes within their transmission ranges.

The relay function may not only expand the size of the network, and also improve the robustness of the network. By way of an example in FIG. 3, when node A intends to send a data packet to node F, node B may help to relay and forward the data packet from node A; similarly, nodes C and D, as relay nodes within the communication range of node A, will also help to relay and forward the data packet. Even if node B in the network is powered off due to a breakdown, nodes C and D may continue to relay and forward the data packet, and the communication between nodes A and F will not be affected, thus providing strong robustness of the network. However, a problem will be caused that each node may receive multiple duplicate data packets because the same message may be forwarded by many relay nodes. By way of an example in FIG. 3, node F may receive a data packet sent from node A and relayed by nodes B, C and D. For the purpose of making a more robust Mesh network, relay nodes may continuously forward the data packet several times; for instance, node C may receive the data packet sent by node A and continuously forward the same data packet several times (e.g., three times); similarly, nodes B and D also receive the same data packet sent by node A and continuously forward the data packet several times; therefore, the number of duplicate data packet received by node F may be 3*3=9. For a dense network composed of hundreds of nodes, it is conceivable that the nodes would receive a very large number of repeatedly forwarded data packets over the air. The dense network may be, for example, a network where all devices or a large number of devices are within one-hop range of each other.

In a Bluetooth Mesh network, all data packets received by nodes through a Bluetooth link layer are generally transmitted to a Bluetooth Mesh network layer first. The Bluetooth Mesh network layer then de-obfuscates data packets, even further decrypts them in the network layer, and finally judges whether they are the data packets processed before. For a network composed of thousands of nodes, different data packets are sent by nodes over the air and relayed and forwarded by surrounding devices; as a result, the network layer of nodes receive many duplicate data packets that will be analyzed and processed by a lot of resources of Bluetooth Mesh network layer. If there are too many redundant data packets, it will also delay the processing of key data packets that need to be processed in time, resulting in a slow network response.

Therefore, there is a need for a method for filtering most redundant data packets in the Bluetooth Mesh network layer in advance, without the need of decryption and de-obfuscation. It should be understood that the technical problems listed above are only exemplary rather than limiting the present disclosure, and the present disclosure is not limited to the technical solutions for solving all of the above-described technical problems at the same time. The technical solutions of the present disclosure may be implemented to solve one or more of the above-described or other technical problems.

SUMMARY OF THE INVENTION

In view of the above problems, a purpose of the present disclosure is to provide a method for filtering most redundant data packets in the Bluetooth Mesh network layer in advance without the need for decryption and de-obfuscation, which can be conveniently implemented and consumes less Bluetooth Mesh network layer resources.

The present disclosure provides a method for filtering a redundant data packet at a node in a Bluetooth Mesh network. The method includes the following steps: providing a deduplication filtering cache for storing a combined field value of one or more specified fields of each of one or more Bluetooth Mesh data packets received by the node, wherein the combined field value of the one or more specified fields includes at least one obfuscated field value; upon receipt of a Bluetooth Mesh data packet by the node, comparing a combined field value of one or more specified fields of the data packet with each combined field value stored in the deduplication filtering cache, wherein the data packet will be discarded if the combined field value of the one or more specified fields of the data packet is the same as a combined field value stored in the deduplication filtering cache; and the combined field value of the one or more specified fields of the data packet will be stored into the deduplication filtering cache, and the data packet is reported to the same layer or an upper layer in a protocol stack, if the combined field value of the one or more specified fields of the data packet is not the same as any combined field value stored in the deduplication filtering cache.

Optionally, the one or more specified fields of the data packet comprise a SEQ field and a SRC field, and a combined field value of the one or more specified fields comprises obfuscated field values of the SEQ field and the SRC field.

Furthermore, the one or more specified fields of the data packet further comprise an NID field, and the combined field value of the one or more specified fields further comprises a field value of the NID field.

Optionally, the method of the present disclosure further comprises comparing an NID of the received data packet with NIDs of the one or more Bluetooth Mesh networks joined by the node prior to performing a comparison for the combined field value; and discarding the data packet if the NID of the received data packet is different from any NID of one or more Bluetooth Mesh networks joined by the node.

Optionally, the deduplication filtering cache is provided at a Bluetooth Mesh network layer or a lower layer.

Optionally, the deduplication filtering cache is provided at a Bluetooth link layer.

Optionally, the oldest combined field value in the deduplication filtering cache will be discarded if the deduplication filtering cache is full when the combined field value is to be stored into the deduplication filtering cache.

Optionally, the received data packet is a valid Bluetooth Mesh data packet or an invalid Bluetooth Mesh data packet.

Optionally, the received data packet is a data packet from one or more Bluetooth Mesh networks joined by the node or a data packet from a Bluetooth Mesh network not joined by the node.

Optionally, the step of discarding the data packet is performed prior to de-obfuscating and decrypting the received data packet.

In accordance with the method of the present disclosure, most redundant data packets are filtered at the Bluetooth Mesh network layer or lower layers, without the need of de-obfuscating, MIC (Message Integrity Check) integrity verification and decryption processes at the Bluetooth Mesh network layer. Thus, redundant data packets received by the Bluetooth Mesh network layer are greatly reduced, and less Bluetooth Mesh network layer resources are consumed. It should be understood that the lower layer may be the Bluetooth Mesh protocol stack or any lower layer therein, such as a link layer in the Bluetooth protocol stack.

DETAILED DESCRIPTION OF THE PREFERRED EMBODIMENTS

The technical solution of the present disclosure will be described in detail with reference to the accompanying drawings. It should be understood that the embodiments shown in the accompanying drawings and described below are merely illustrative and not limiting to the present disclosure.

Figure 1:
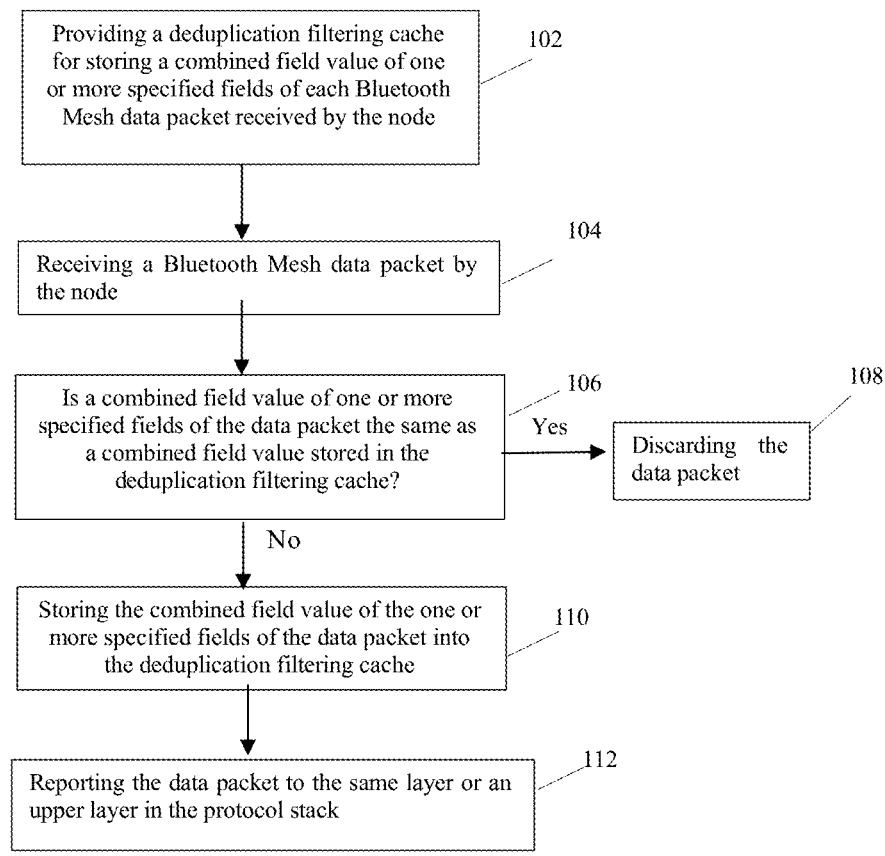
FIG. 1 illustrates a method for filtering a redundant data packet at a node in a Bluetooth Mesh network in accordance with one embodiment of the present disclosure.

FIG. 1 illustrates a method for filtering a redundant data packet at a node in a Bluetooth Mesh network in accordance with an embodiment of the present disclosure. Specifically, the method includes the following steps shown in FIG. 1. In step 102, a deduplication filtering cache is provided for storing a combined field value of one or more specified fields of each of one or more Bluetooth Mesh data packets received by the node, wherein the combined field value of the one or more specified fields includes at least one obfuscated field value. In step 104, the Bluetooth Mesh data packet is received by the node. In step 106, comparing the combined field value of the one or more of specified fields of the data packet with each combined field value stored in the deduplication filtering cache is performed. In step 108, the data packet is discarded if the combined field value of the one or more specified fields of the data packet is the same as a combined field value stored in the deduplication filtering cache. In step 110, the combined field value of the one or more specified fields of the data packet is stored into the deduplication filtering cache if the combined field value of one or more specified fields of the data packet is not the same as each of the combinations of field values stored in the deduplication filtering cache. In step 112, the data packet is reported to a same layer or an upper layer in a protocol stack.

Figure 2:
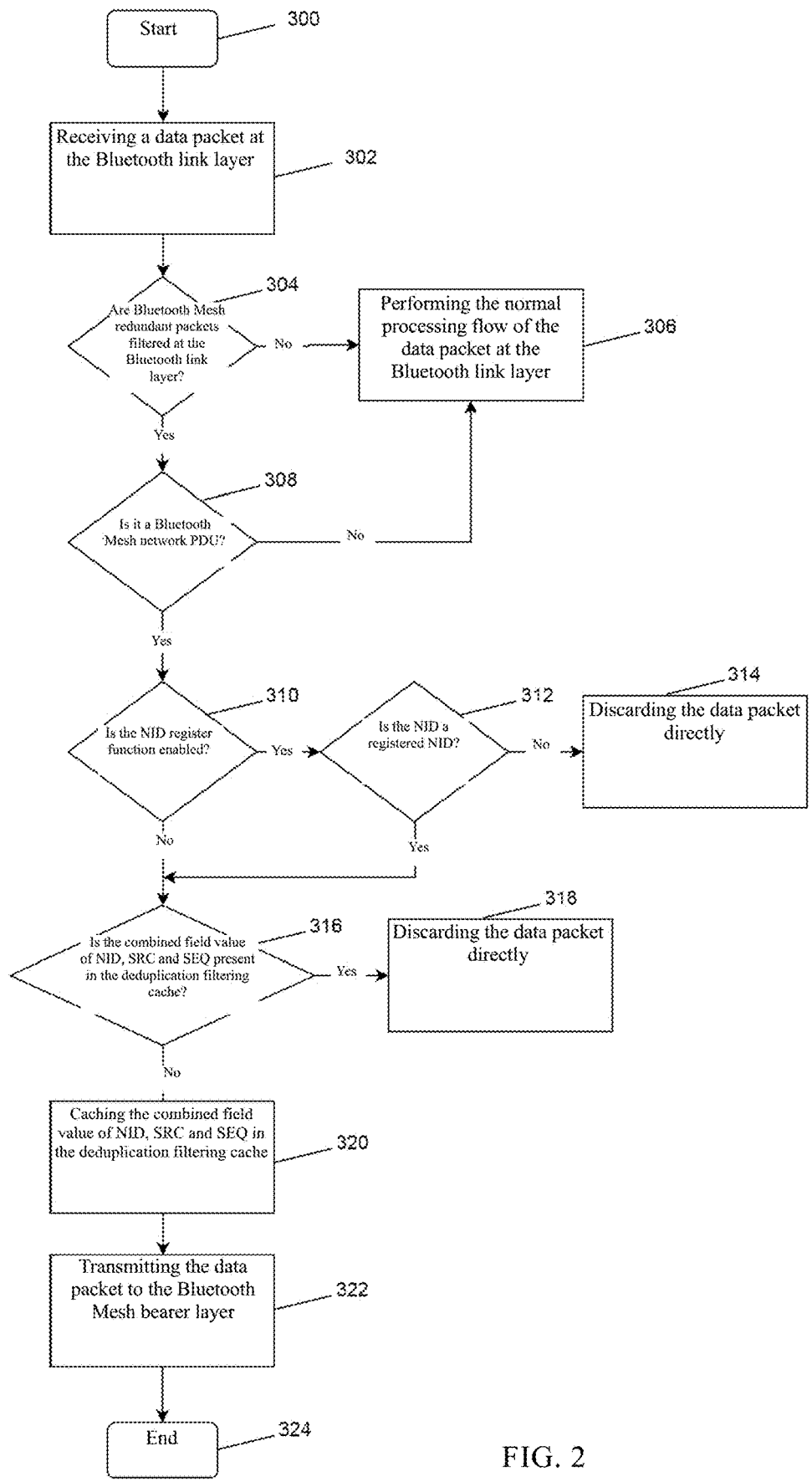
FIG. 2 illustrates a flow chart of a method for filtering a redundant data packet in a Bluetooth link layer in accordance with one embodiment of the present disclosure.
Figure 3:
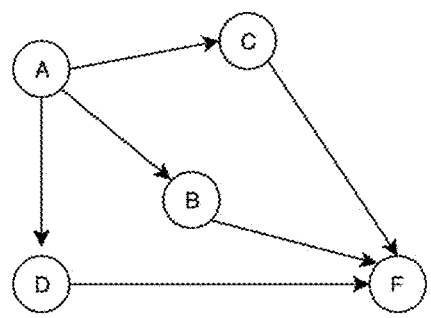
FIG. 3 illustrates a schematic diagram of a Bluetooth Mesh network.

FIG. 2 illustrates a flow chart of a method for filtering a redundant data packet in a Bluetooth link layer in accordance with one embodiment of the present disclosure. As shown, provided at the Bluetooth link layer is a deduplication filtering cache for storing a combined field value of one or more specified fields of each of one or more Bluetooth Mesh data packets received by the node, so as to filter redundant Bluetooth Mesh data packets, especially Bluetooth Mesh network layer data packets. As a non-limiting example, one or more specified fields are, for example, NID (Network ID), SRC (Source Address) and SEQ (Sequence Number) specified according to the Bluetooth Mesh protocol, wherein SRC and SEQ are obfuscated values, and NID is used to distinguish which network this data packet belongs to.

In the present disclosure, NIDs of one or more Bluetooth Mesh networks where nodes are located may be registered in an "NID list", the function of which is called "NID Register". If the "NID Register" function is disabled, in this scenario, the NIDs must be cached because the deduplication filtering cache (e.g., deduplication filtering cache of Bluetooth link layer) may store data packets from different NIDs, and SRCs from different networks are likely to be duplicated. If the "NID Register" function is enabled and a plurality of NIDs are registered by a user, the NIDs must be cached because data packets from different NIDs may be stored in the deduplication filtering cache and SRCs of different networks are likely to be duplicated. If the "NID Register" function is enabled and only one NID is registered by the user, the NID may not have to be cached because the data packets in the cache all correspond to the same NID and the data packets of other networks are discarded. Optionally, for the convenience of implementation, the NID value may always be cached in accordance with the method of the present disclosure. SRC denotes a source address of the current data packet, which is only related to the node from which the data packet is sent and is unrelated to the relay/forwarding node. SEQ denotes the sequence number of the current data packet, and the sequence number of each data packet sent from the same source address is different, even if the data packet is sent to different destination addresses, the sequence number is not duplicated. Therefore, to a large extent, only determination of whether the source address and sequence number of the data packet are the same is needed to determine whether the data packet is the same data packet, without the need for determining whether the destination address and the data packet content are the same.

As shown in FIG. 2, a data packet is received by the Bluetooth link layer (step 302). If the Bluetooth Mesh redundant packet filtering operation is not performed at the Bluetooth link layer, the normal processing flow will be performed for the data packet (step 306), that is, the data packet will be reported from the link layer to the upper layer of the Bluetooth Mesh network. If a Bluetooth Mesh redundant packet filtering operation is performed at the Bluetooth link layer (step 304), whether the data packet is a Bluetooth Mesh network PDU (Protocol Data Unit) may be determined (step 308). If it is determined that the data packet is not a Bluetooth Mesh network PDU, the normal processing flow will be performed for the data packet at the Bluetooth link layer (step 306). If the data packet is determined to be a Bluetooth Mesh network PDU, a determination of which network the data packet comes from is performed, that is, the determination of the NID of the data packet may be performed. If the NID register function is enabled, whether the NID of the data packet is in the NID list registered by the user is determined. If the NID of the data packet is not in the list, it means that the data packet is not a data packet in the current network and may be directly discarded (step 314). If the NID is in the "NID list" registered by the user, it means that the data packet may be one data packet of the present network, and next step will be performed: comparing whether a combined field value of one or more specified fields of the data packet is in the deduplication filtering cache, that is, determining whether a combination or combined value of NID, SRC and SEQ fields is stored in the deduplication filtering cache (step 316). If it is determined that the combination of NID, SRC and SEQ fields is stored in the deduplication filtering cache, it means that the data packet is already in the cache and is redundant, then the data packet will be directly discarded (step 318). If it is determined that the combination of NID, SRC and SEQ fields is not stored in the deduplication filtering cache, it means that the combined field value of the specified fields of the data packet is not stored in the deduplication filtering cache and the data packet is not a redundant data packet, then the combination of the fields will be cached in the deduplication filtering cache (step 320). If the deduplication filtering cache is full, the oldest combined field value in the deduplication filtering cache may be discarded. Next, the data packet is transmitted to the Bluetooth Mesh bearer layer (step 322). It is known from the above methods, in accordance with the solution of the present disclosure, the determination of the NID may be performed at the Bluetooth link layer before determining whether there are duplicate data packets in the cache, which has a direct advantage of saving memory space because there is no need to store combined field values of data packets of other networks in the deduplication filtering cache.

In the above embodiment, the deduplication filtering cache is provided at the Bluetooth link layer. In other embodiments, the deduplication filtering cache may also be provided at the Bluetooth Mesh network layer.

In the above embodiment, the received data packet is a valid Bluetooth Mesh data packet or an invalid Bluetooth Mesh data packet. The received data packet is a data packet from one or more Bluetooth Mesh networks joined by the node or a data packet from a Bluetooth Mesh network not joined by the node. In this way, the method of the present disclosure can not only filter redundant valid Bluetooth Mesh data packets, but also can filter redundant invalid Bluetooth Mesh data packets. Further, the method can not only filter data packets from the Bluetooth Mesh network where the node is located, but also can filter the data packets from other Bluetooth Mesh networks. In an embodiment, the invalid Bluetooth Mesh data packet refers to a Bluetooth Mesh data packet that fails to pass the MIC verification.

In addition, the step of discarding the data packet is performed prior to de-obfuscating and decrypting the received data packet.

According to the Bluetooth Mesh protocol, the obfuscated value of the field is related to the value of TTL (Time To Live). Therefore, in accordance with the above method of the present disclosure, the same data packet under the same TTL forwarded by different relay nodes and the same one data packet repeatedly forwarded by the same relay node may be filtered although the same data packet under different TTLs forwarded by different relay nodes cannot be filtered. Especially for a dense network, the change of the TTL would not be too large, and most of data packets forwarded by relay nodes are concentrated in a small TTL change range. In this case, most redundant data packets may be filtered in accordance with the method of the present disclosure.

In accordance with the method of the present disclosure, as a non-limiting example, the filtering of most redundant data packets may be implemented in the link layer of the Bluetooth protocol stack, without the need of de-obfuscating, MIC integrity verification and decryption processes in the Bluetooth Mesh network layer, and thus redundant data packets received by the Bluetooth Mesh protocol layer are greatly reduced.

For example, when someone intends to send a large amount of data (with the same NID of this network) by simulating a node in this Bluetooth Mesh network, a large number of invalid Bluetooth Mesh data packets will be processed at the Bluetooth Mesh protocol layer, for example, performing de-obfuscation, decryption and MIC verification. Based on the solution of the present disclosure, data packets are completely filtered at, for example, the Bluetooth link layer, and these redundant data packets will be reported to the Bluetooth Mesh network layer only once, instead of being transmitted to the Bluetooth Mesh protocol layer every time.

For example, when there are a large number of data packets in one large dense network and a large number of nodes are forwarding data packets, each node may receive many duplicate data packets. If data packets need to be de-obfuscated, decrypted, and MIC-verified at the Bluetooth Mesh network layer before performing a comparison, it may be caused that the processing speed of data packets may become very slow and most resources in the Bluetooth Mesh protocol layer may be consumed to process these duplicate data packets.

The advantages achieved by the method of the present disclosure are further illustrated by the following examples. In a dense network consisting of 1,000 nodes (any two nodes are within one-hop range), device A sends one data packet to device B, which is split into 10 sub-packets with TTL=10.

In a first case, it is assumed that there is no repeated transmission, that is, after device A sends the data packet, device B receives all sub-packets of the data packet forwarded by different nodes over the air, and thus there is no need for device A to continue to repeat the transmission. In theory, each node may forward these 10 sub-packets once, and each node in the network may receive 998*10 forwarded sub-packets in the worst case (except that the sub-packet forwarded by itself should not be received and one with the destination address will not forward the sub-packet). It means that the Bluetooth Mesh network layer needs to de-obfuscate, decrypt and MIC-verify these 9,980 sub-packets.

If the filtering of redundant packets is performed, for example, in the deduplication filtering cache provided at the Bluetooth link layer, in accordance with the method of the present disclosure, only up to 10*10 sub-packets will be reported to the Bluetooth Mesh network layer (every sub-packet with different TTL will be reported), and thus the Bluetooth Mesh network layer only needs to process up to 100 sub-packets. Compared with the previous 9,980 sub-packets, the underlying layers filter nearly 98.998% of the sub-packets, that is, the Bluetooth Mesh network layer only needs to process 1.002% of the original sub-packets, which are 9,880 sub-packets less.

In a second case, it is assumed that there are repeated transmissions, that is, the data packet sent by device A is forwarded by different nodes over the air, so that device B does not receive all the sub-packets of the data packet for the first time, and thus device A needs to continue to repeat the transmission. It is assumed that device A sends 10 sub-packets for the first time, device B only receives 5 sub-packets and replies one ACK (Acknowledgement). Device A resends 5 sub-packets for the second time, and device B receives 3 sub-packets, that is, device B receives 8 sub-packets in total, and responds with one ACK again. Device A continues to resend the remaining 2 sub-packets for the third time, device B finally receives all 10 sub-packets and replies with one ACK for the third time.

Through the above calculation, in the theoretically worst case, every node will forward data packets, and every node in the network will receive 998*11+998*6+998*3=19,960 Bluetooth Mesh data packets, including the above sub-packets and ACK packets (except that the source node does not need to receive data packets sent by itself and the goal node does not need to forward data packets sent to itself), which means that the Bluetooth Mesh network layer needs to de-obfuscate, decrypt and MIC-verify these 19,960 data packets according to the prior art.

If the filtering of redundant packets is performed through the deduplication filtering cache at the Bluetooth link layer in accordance with the method of the present disclosure, up to 10*11+10*6+10*3=200 data packets will be reported to the Bluetooth Mesh network layer (including data packets with different TTL), and the Bluetooth Mesh network layer only needs to process 200 data packets at most. Compared with the previous 19,960 data packets, the underlying layers filter 98.998% of the data packets, that is, the Bluetooth Mesh network layer needs to process only 1.002% of the original data packets, which are 19,760 data packets less.

Different from the solution in the prior art that the contents in the cache are compared after de-obfuscating the obfuscated fields of the data packet, verifying the MIC integrity and decrypting the encrypted field, the method of the present disclosure may help to determine whether a data packet is a redundant data packet without decrypting the encrypted field and de-obfuscating the obfuscated field, which greatly simplifies the processing flow.

Although various embodiments in different aspects of the present disclosure have been described for the purpose of the present disclosure, it should not be understood that the teaching of the present disclosure are limited thereto. The features disclosed in one embodiment are not limited thereto but may be combined with features disclosed in other embodiments. For example, one or more features and/or operations of the method of the present disclosure described in one embodiment may also be applied separately, in combination or as a whole to another embodiment. It should be further understood that the above-described steps of the method may be executed sequentially or in parallel, combined into fewer steps, divided into more steps, or combined and/or eliminated in a different way than that described herein. It should be understood by those skilled in the art that there are still more alternative embodiments and variants thereof, and various changes and modifications may be made to the above steps of the method without departing from the scope defined by the claims of the present disclosure.

The invention claimed is:

1. A method for filtering a redundant data packet at a node in a Bluetooth Mesh network, comprising the following steps of:

providing a deduplication filtering cache for storing a combined field value of one or more specified fields of each of one or more Bluetooth Mesh data packets received by the node, wherein the combined field value of specified fields includes at least one obfuscated field value; and upon receipt of a Bluetooth Mesh data packet by the node, comparing a combined field value of one or more specified fields of the data packet with each combined field value stored in the deduplication filtering cache, wherein:

discarding the data packet if the combined field value of the one or more specified fields of the data packet is the same as a combined field value stored in the deduplication filtering cache; and storing the combined field value of the one or more specified fields of the data packet into the deduplication filtering cache and reporting the data packet to a same layer or an upper layer in a protocol stack if the combined field value of the one or more specified fields of the data packet is not the same as any combined field value stored in the deduplication filtering cache.

2. The method according to claim 1, wherein the one or more specified fields of the data packet comprises a SEQ field and a SRC field, and the combined field value comprises obfuscated field values of the SEQ field and the SRC field.

3. The method according to claim 2, wherein the one or more specified fields of the data packet further comprises an NID field, and the combined field value further comprises a field value of the NID field.

4. The method according to claim 1, further comprising:

comparing an NID of the received data packet with NIDs of one or more Bluetooth Mesh networks joined by the node prior to performing a comparison for the combined field value; and discarding the data packet if the NID of the received data packet is different from each of the NIDs of the one or more Bluetooth Mesh networks joined by the node.

5. The method according to claim 1, wherein the deduplication filtering cache is provided at a Bluetooth Mesh network layer or a lower layer.

6. The method according to claim 5, wherein the deduplication filtering cache is provided at a Bluetooth link layer.

7. The method according to claim 1, wherein if the deduplication filtering cache is full when the combined field value is to be stored into the deduplication filtering cache, discarding an oldest combined field value in the deduplication filtering cache.

8. The method according to claim 1, wherein the received data packet is a valid Bluetooth Mesh data packet or an invalid Bluetooth Mesh data packet.

9. The method according to claim 8, wherein the received data packet is a data packet from one or more Bluetooth Mesh networks joined by the node or a data packet from a Bluetooth Mesh network not joined by the node.

10. The method according to claim 1, wherein the step of discarding the data packet is performed prior to de-obfuscating and decrypting the received data packet.

* * * * *